US011955734B2

(12) United States Patent
Lebaron et al.

(10) Patent No.: US 11,955,734 B2
(45) Date of Patent: Apr. 9, 2024

(54) ANTENNA FOR HIGH-PERMITTIVITY MEDIA

(71) Applicant: Uro Medical Corporation, Boca Raton, FL (US)

(72) Inventors: Richard Lebaron, Surprise, AZ (US); Laura Tyler Perryman, Miami Beach, FL (US)

(73) Assignee: Uro Medical Corporation, Boca Raton, FL (US)

( * ) Notice: Subject to any disclaimer, the term of this patent is extended or adjusted under 35 U.S.C. 154(b) by 0 days.

(21) Appl. No.: 17/646,475

(22) Filed: Dec. 29, 2021

(65) Prior Publication Data

US 2022/0336955 A1 Oct. 20, 2022

Related U.S. Application Data

(60) Provisional application No. 63/131,745, filed on Dec. 29, 2020.

(51) Int. Cl.
*H01Q 9/04* (2006.01)
*H01Q 1/27* (2006.01)

(52) U.S. Cl.
CPC ............. *H01Q 9/045* (2013.01); *H01Q 1/273* (2013.01)

(58) Field of Classification Search
CPC ....... H01Q 9/045; H01Q 1/273; H01Q 13/106
See application file for complete search history.

(56) References Cited

U.S. PATENT DOCUMENTS

2014/0180365 A1 6/2014 Perryman et al.
2018/0034137 A1* 2/2018 LeBaron .............. G06K 19/067
2019/0326656 A1* 10/2019 Sotzing ................ C09D 165/00

* cited by examiner

*Primary Examiner* — Dieu Hien T Duong
(74) *Attorney, Agent, or Firm* — Banner & Witcoff, Ltd.

(57) ABSTRACT

A slotted patch antenna used to generate polarized radio frequency fields in media having high permittivity. The slotted patch antenna may include a plurality of conductor layers, each being electrically coupled through a capacitive layer. The layers may contain pluralities of slots that form pluralities of conductor segments. The feed conductors carrying radio frequency signals may be capacitively coupled to intermediate conductors. The slotted patch antenna may include tuning conductor segments and slots. The slotted patch antenna may include conductor segments and slots that control current paths, internal field distributions, transmitted field distributions, and direction of transmission.

13 Claims, 7 Drawing Sheets

FIG 9
| Layer No. | Material | Thickness (mm) | Dielectric | Conductivity (S/m) |
|---|---|---|---|---|
| 1 | Cotton | 1.0 | 1.00 | 0.000 |
| 2 | Skin (Dry) | 3.0 | 41.30 | 0.872 |
| 3 | Fat (Not infiltrated) | 3.0 | 5.46 | 0.051 |
| 4 | Bone (Cortical) | 8.0 | 12.40 | 0.145 |
| 5 | Bone (Cancellous) | 8.0 | 20.80 | 0.344 |
| 6 | Bone (Cortical) | 8.0 | 12.40 | 0.145 |
| 7 | Muscle | 20.0 | 55.00 | 0.948 |
| 8 | Fat (Not infiltrated) | 3.0 | 5.46 | 0.051 |
| 9 | Skin (Dry) | 3.0 | 41.30 | 0.872 |
FIG 10
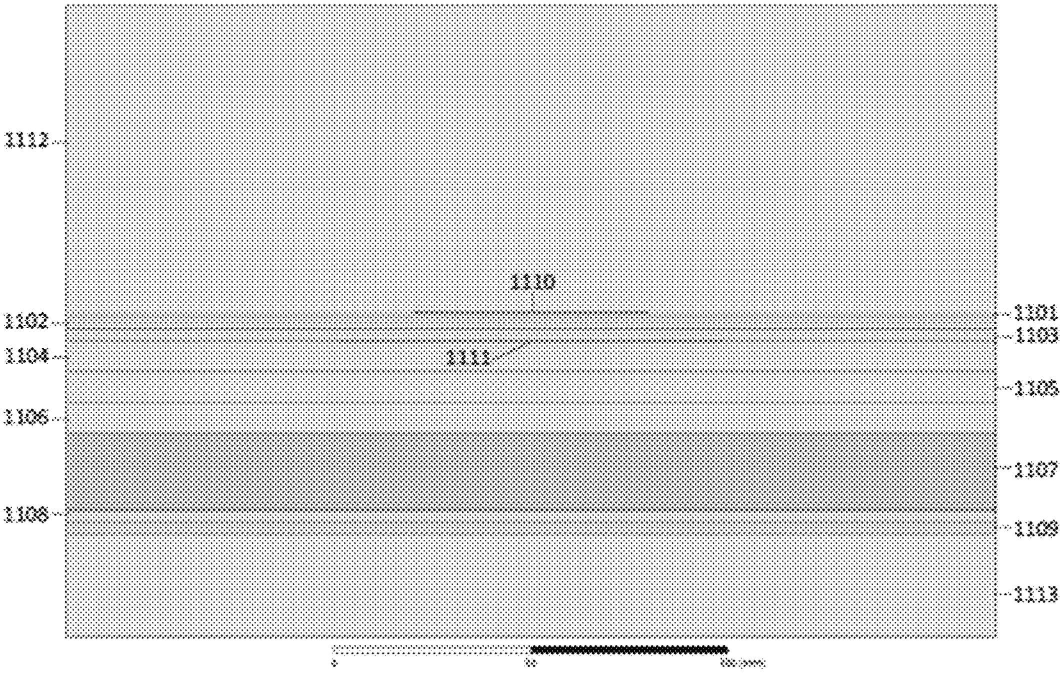
Figure 11

ANTENNA FOR HIGH-PERMITTIVITY MEDIA

RELATED APPLICATION

This application claims priority to U.S. Provisional Patent Application Ser. No. 63/131,745, filed Dec. 29, 2020, the disclosure of which is incorporated by reference herein in its entirety and made part hereof.

TECHNICAL FIELD

This application relates generally to a flexible antenna designed to transmit radio signals into a high-permittivity media such as body tissue efficiently.

BACKGROUND

Electrical devices may be designed with internalized antennas to receive wireless radio frequency (RF) signals from transmitting antennas, whether external to the device or in close proximity to the receiving antenna. These receiving devices may require the radio signals for data communications, and in certain applications the received signals may provide energy to charge the receiving devices. In a specialized application, a receiving device can be embedded within a medium having high permittivity, where the medium itself presents impedance effecting the efficiency of the transmission of RF signals. For such an application, the external transmitter can be purposefully designed to couple the RF signal into the medium efficiently to reach the electrical device internalizedantenna.

The design of the transmitting antenna can dramatically affect the efficiency of RF signal transmission into the medium. This invention presents a transmitting antenna intended to transmit RF signals into tissue medium with the antenna design features as thin, flexible, light weight, and electrically small. For greatest utility, the transmitting antenna is designed to create a relatively uniform RF field at a given zone in the tissue, meaning the embedded receiving device can receive RF signals from the transmitting antenna even with a degree of misalignment.

In one embodiment, the transmitting antenna may transmit RF power to an implanted electrical device. For example, the implanted electrical device may transmit electrical impulses to excitable tissue, such as nerves, for treating chronic pain, inflammation, arthritis, sleep apnea, incontinence, or other medical disorders.

SUMMARY

In one aspect, the slotted patch antenna transmits RF signals into a medium more efficiently than a conventionally designed antennas. The RF signals transmitted into the medium may supply power and/or data to an embedded receiver within an implanted electrical device. The slotted patch antenna is designed to have a smaller size than similar RF antennas designed using conventional techniques. In spite of its smaller size, the slotted patch antenna has operating characteristics equivalent to those of larger antennas.

In another aspect, the slotted patch antenna may include two or more conductor layers separated by thin layers of dielectric. The slotted patch antenna may be flexible, semi-rigid, or rigid.

In another aspect, the slotted patch antenna may contain a feed conductor layer and a transmitting conductor layer.

In another aspect, the feed conductors of the slotted patch antenna may be coplanar with signal and ground conductor segments.

In another aspect, the conductors of the slotted patch antenna may be segmented by slots (zones without conducting material). Slots may limit or control the direction of current flow in the conductors. The layout of the slots may affect the distribution of the RF field created in the medium by the slotted patch antenna.

In another aspect, the slotted patch antenna conductors may be perforated in a manner that allows electromagnetic energy to flow through the slotted patch antenna.

In another aspect, the slotted patch antenna length and/or width may be less than or equal to $1/5^{th}$ of the wavelength of the RF signal in the medium. The slotted patch antenna in this aspect would be described as "electrically small" and may be considered to be a "sub-wavelength" antenna. Although the present slotted patch antenna design is targeted for use at a frequency in the 1 GHz range, the design approach for the slotted patch antenna may be used to scale the size for operation at frequencies in the range from approximately 100 MHz to 3 GHz.

In another aspect, the slotted patch antenna may include perforations allowing ambient air to flow through the slotted patch antenna. In this aspect, the slotted patch antenna allows perspiration under it to dry readily with increased air flow, generally improving the comfort of the user when the slotted patch antenna is placed near or directly on the skin. The slotted patch antenna design allows such holes to be present without interfering with the performance of slotted patch antenna.

In another aspect, the slotted patch antenna may have electrical circuitry, which may include a battery, located on the slotted patch antenna. The slotted patch antenna design allows such circuitry to be present without interfering with the performance of the slotted patch antenna.

The details of one or more implementations are set forth in the accompanying drawings and the description below. The figures describe various aspects and features of various aspects for the slotted patch antenna. The design is generally a patch antenna that in some aspects includes a coplanar feed conductor layer. The various conductors are slotted in some aspects. Other features, objects, and advantages will be apparent from the description and drawings, and from the claims.

BRIEF DESCRIPTION OF DRAWINGS

FIG. 9 depicts a model of a receiving device (dipole) that may be embedded in a medium and receive RF signals from the slotted patch antenna. The simulated receiving device is used in computer simulations to assess the RF-transmission performance of the slotted patch antenna relative to other types of antennas.

FIG. 10 is a table of the simulated media and corresponding thicknesses used in one type of computer model, a simple-layer model, which approximates the heterogenous layers of tissue at a certain location in the body. The simple-layer model may be used to assess the RF-transmission performance of the slotted patch antenna relative to other types of antennas.

FIG. 11 depicts a cross section of the simulation space showing the simple-layer model, the location of the Antenna 1110, and one possible location of the simulated receiving device 1111 (dipole). Zone 1112 is the air above the body surface, and layer 1101 thin fabric (cotton). Layer 1102 is the surface of the body (skin). The simulated receiving device 1111 can be positioned at various depths below the body surface.

FIG. 12 shows the effect of displacing the receiving device laterally relative to the slotted patch antenna, and FIG. 13 shows the effect of displacing the receiving device longitudinally relative to the slotted patch antenna. For comparison, the simulation results from typical antennas are shown (dipole and dipole array), where the typical antennas are physically substantially larger than the slotted patch antenna.

DETAILED DESCRIPTION

Figure 1:
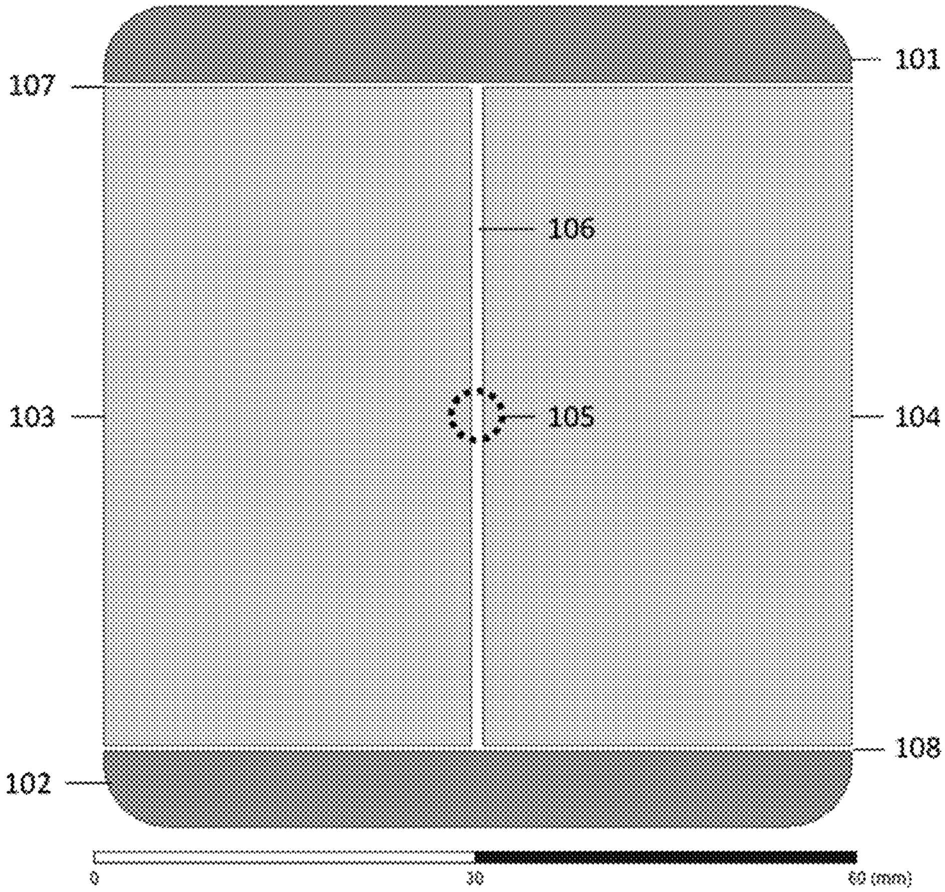
FIG. 1 depicts the first conductor layer of the slotted patch antenna segmented by three slots, two horizontal 107 and 108 and one vertical 106. The slots separate the conductor layer into four segments. Two of the segments are coplanar feed conductors, one being a ground conductor 103 and one being a signal conductor 104. The additional two segments conductors 101 and 102 are electric-field shielding.

In various implementations, systems and methods are disclosed for applying one or more electrical impulses to targeted excitable tissue, such as nerves, for treating chronic pain, inflammation, arthritis, sleep apnea, seizures, incontinence, pain associated with cancer, incontinence, problems of movement initiation and control, involuntary movements, vascular insufficiency, heart arrhythmias, obesity, diabetes, craniofacial pain, such as migraines or cluster headaches, and other disorders. In certain embodiments, a device may be used to send electrical energy to targeted nerve tissue by using remote radio frequency (RF) energy without cables or inductive coupling to power a passive implanted wireless stimulator device. The targeted nerves can include, but are not limited to, the spinal cord and surrounding areas, including the dorsal horn, dorsal root ganglion, the exiting nerve roots, nerve ganglions, the dorsal column fibers and the peripheral nerve bundles leaving the dorsal column and brain, such as the vagus, occipital, trigeminal, hypoglossal, sacral, coccygeal nerves and the like.

A wireless stimulation system can include an implantable device with one or more electrodes and one or more conductive antennas (for example, dipole or patch antennas), and internal circuitry for frequency waveform and electrical energy rectification. The system may further comprise an external controller and antenna for transmitting radio frequency or microwave energy from an external source to the implantable device with neither cables nor inductive coupling to provide power.

In various implementations, the wireless implantable device is powered wirelessly (and therefore does not require a wired connection) and contains the circuitry necessary to receive the pulse instructions from a source external to the body. For example, various embodiments employ the slotted patch antenna configuration(s) to receive RF power through electrical coupling. This allows such devices to produce electrical currents capable of stimulating nerve bundles without a physical connection.

Slotted patch antennas, such as the aspects disclosed herein, can be designed for the purpose of transmitting microwave energy to a receiving antenna located just below a patient's skin, or on the skin, from a distant location (e.g., of up to four to six feet and stationary). The slotted patch antenna design may be dependent on the mobility needs of the patient while receiving the therapy. The disclosure focuses on the design of a slotted patch antenna with superior matching and gain, as well as being several orders of magnitude less expensive than comparable antennas and very easy to manufacture.

According to some implementations, a wireless stimulation system can include a slotted patch antenna assembly coupled to a controller module and configured to radiate electromagnetic energy to an implantable device. In some instances, the implantable device can be a passive device configured to receive RF energy and stimulation parameters wirelessly. Solely by using the received electromagnetic energy, the implantable device creates one or more stimulation pulses to stimulate neural tissue of a patient. In particular, the antenna assembly can include a slotted patch antenna radiating surface and a feed port. The feed port may be coupled to a controller module that drives the antenna to transmit the electromagnetic energy from the slotted patch antenna radiating surface. In one example, the implantable device includes a slotted patch antenna and the radiating surface is configured to transmit polarized electromagnetic energy commensurate with dipole reception characteristics.

The field of this invention is the realm of specialized RF antennas designed to transmit RF signals into a medium of high permittivity relative to air (or vacuum). Although the slotted patch antenna is specifically intended to transmit RF signals into body tissue through the slotted design, the principles of the slotted patch antenna are not limited only to one specific application. This invention can be readily used in applications of RF transmission into any medium of high permittivity. In the context of this disclosure, the term "body tissue coupled" antenna should be understood to mean any antenna designed to couple RF signals into a medium of high permittivity.

In the realm of body tissue coupled antennas, the slotted patch antenna has several advantages compared to conventional antenna designs, such as designs based on the single-element dipole antenna or the traditional patch antenna.

One of the advantages of the slotted patch antenna compared to single element dipole antennas or traditional patch antenna designs lies in the strategic placement of conductors and slots for the slotted patch antenna design allows for electrically smaller layout and size, with similar performance to the classic larger antennas.

The various embodiments of the slotted patch antenna design may include one or more slots in the conducting layers that control the RF current paths, thereby advantageously shaping the RF field created in the medium by the slotted patch antenna. In some embodiments, the addition of capacitively coupled conductors allows for the slotted patch antenna to be further reduced in length and width.

Slots in the conductor layers are designed to adjust the input impedance of the slotted patch antenna such that it matches the output impedance of the RF transmitter circuitry that supplies the RF signal to the slotted patch antenna. Generally matching an antenna's input impedance to the transmitter's output impedance is important for efficiency and other performance metrics.

The slots of the slotted patch antenna conductors modify the input impedance of the slotted patch antenna by shaping the RF field created by the slotted patch antenna in the medium. The slotted patch design allows the slotted patch antenna to be physically thin compared to traditional parallel-conductor patch antennas.

Another advantage of the slotted patch antenna is the capability to distribute RF power laterally across the face of the slotted patch antenna, which reduces the specific absorption rate (SAR) of the RF power at the body surface. This is crucial to preventing a SAR "hot spot" in the tissue. Generally a body-worn antenna that exhibits a SAR hot spot in the tissue must be operated at a relatively low average power to prevent the hot-spot zone from exceeding a temperature safety limit. The design of the slotted patch antenna distributes RF power laterally across the face of the slotted patch antenna, reducing the SAR, with the advantage that the slotted patch antenna can transmit relatively higher RF power into the body without exceeding the temperature safety limit.

Another advantage of the slotted patch antenna is the laterally wide RF field created in the medium assists the slotted patch antenna to successfully illuminate the receiving device embedded in the medium. In real-world scenarios, a user may use the slotted patch antenna to transmit RF signals to an implanted medical device, for example. Generally, for this type of application, an antenna with a wider RF field distribution is easier to align with the implanted device embedded receiving antenna.

Another advantage of the slotted patch antenna design is the ability of the slotted patch antenna to distribute the transmitted RF into the medium in a longitudinal aspect. This is an important design feature that is unique to the slotted patch antenna. Generally, an electrically short antenna concentrates electric field in the longitudinal direction, which creates two problems: 1) a SAR "hot spot" in the medium (tissue), and 2) a field profile at the depth of the receiving device that is inefficient for power transfer to the receiving device. However, the slotted patch antenna creates a longitudinal field profile in the medium that is a flatter than expected for an electrically small antenna. This reduces the SAR of the slotted patch antenna and improves the RF power transmission to an embedded receiving device antenna.

Generally, when utilizing a shorter antenna, the energy is naturally more concentrated longitudinally and the electric field is exposed to less tissue, only at the slot, where the implant may be placed subcutaneously so that the RF energy may be deposited directly on the implant receiving antenna and RF energy is not wasted.

Another advantage of the slotted patch antenna is that electrical circuitry, or a battery, may be placed directly over the back of the slotted patch antenna without interfering with the RF fields transmitted into the medium, as would be the case for a dipole antenna or a dipole array antenna.

Figure 2:
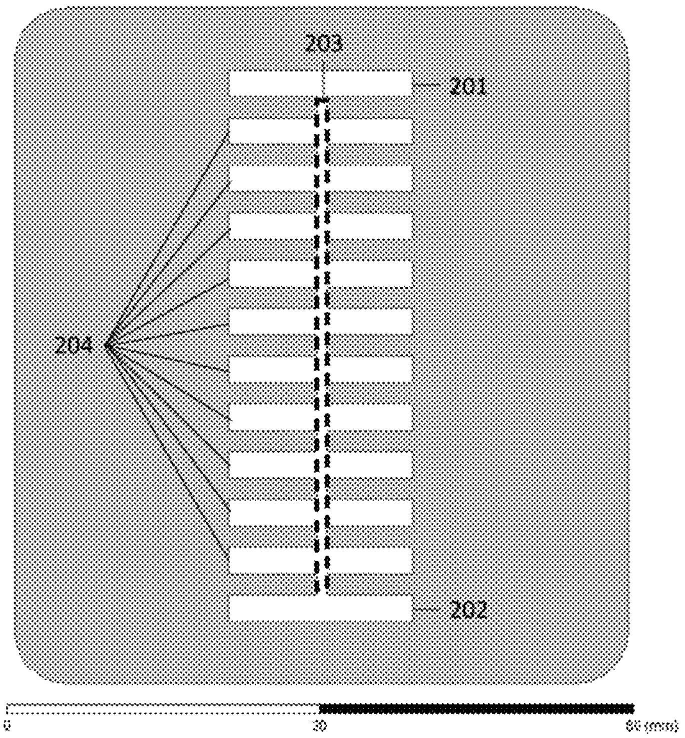
FIG. 2 shows a second conductor layer of the slotted patch antenna. This layer contains multiple slots including one vertical slot 203 and multiple horizontal slots 204 that cross the vertical slot.

In the example embodiments shown in FIG. 1 and FIG. 2, the slotted patch antenna has equal length and width, however other implementations may have different aspect ratios.

The first conductor layer of FIG. 1 is the signal feed conductor layer, which has four metal segments shown in the embodiment, but could have additional segments in various other embodiments (not shown). The top conductor segment 101 and bottom conductor segments 102 are shielding conductors. The two conductor segments in the middle are the co-planer feed conductors, ground conductor segment 103 and signal conductor segment 104, respectively. In this example, the feed conductors are co-planer.

In some embodiments, the feed conductors receive RF from a coaxial cable at the center RF feed point 105 of the slotted patch antenna, and they capacitively distribute the RF field between the feed layer and the transmitting layer of FIG. 2. In this embodiment, the ground 103 and signal 104 conductor segments are separated by a slot 106 down their center, spanning their width. The feed conductor segments 101 and 102 are separated from the shielding conductor segments 103 and 104 with slots 107 and 108 that span the length of the slotted patch antenna. The shielding conductor segments 103 and 104 shield the electric field of the currents that flow on the transmitting conductor layer of FIG. 2. The type of shielding described can be utilized to prevent the current electric field from interacting with the adjacent lossy medium, an example of which could be human tissue medium.

The transmitting conductor layer is shown in FIG. 2. The transmitting conductor layer is slotted to allow for the overall dimensions of the slotted patch antenna to be electrically small at approximately $1/5^{th}$ of the free space wavelength. At this size, the slotted patch antenna may be in resonance at the RF frequency in some embodiments. In order to ensure resonance, the slots are placed strategically to segment the conductor layers appropriately in order to control the flow path of electrical currents as well as to control the capacitance and inductance associated with the conductor segments.

The transmitting conductor layer of FIG. 2 has slots 201 and 202 to encourage a current flow path around the side of the slotted patch antenna from one end to the other. The transmitting conductor layer has a slot 203 perpendicular to the length of the slotted patch antenna. The purpose of this slot is to polarize the RF field in the medium in front of the slotted patch antenna. The transmitting conductor layer has horizontal slots 204 to affect the match of the slotted patch antenna which distribute the RF field evenly across the width of the slotted patch antenna radiation slot 203.

The horizontal slots 204 in the transmitting layer of the slotted patch antenna control the direction of current as it flows across the center vertical slot 203. The separation of these slots 204 may be adjusted to control the electric field distribution along the width of the slotted patch antenna. These horizontal slots 204 also play a key role in adjusting the capacitance between the co-planar feed conductors, ground 103, signal 104 conductor segments, and the conductor of layer two, controlling both energy transmission and matching of the slotted patch antenna. The slot 204 widths also control the inductance in the conductor segments where currents flow across the radiating slot 203 of the slotted patch antenna.

Figure 3:
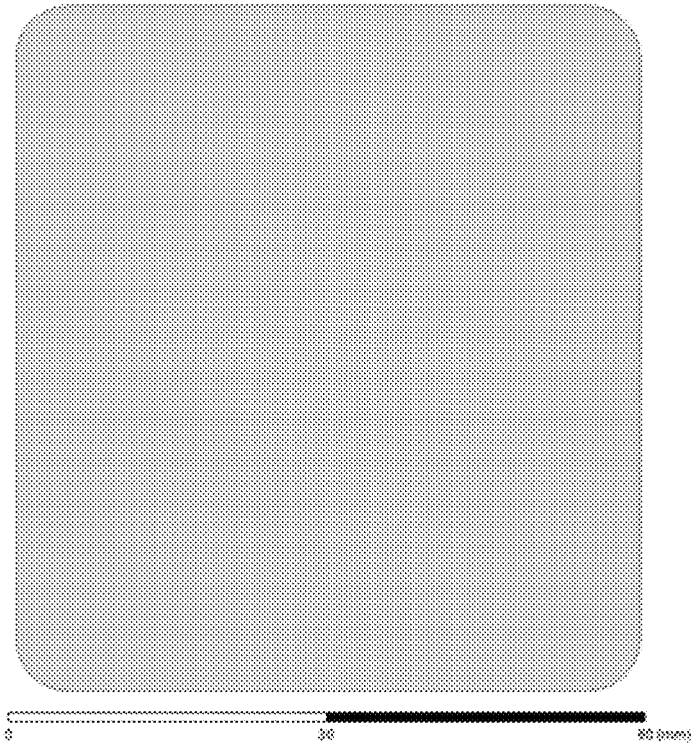
FIG. 3 depicts a dielectric layer of the slotted patch antenna that isolates the conductor layer of FIG. 1 from the conductor layer of FIG. 2.

The insulation layer of FIG. 3 is between the two conductor layers can be on the order of 1-2 millimeter in thickness, to 7-8 millimeter in other embodiments. In this example, the insulating layer thickness is 1 millimeter in thickness. The insulating layer spans the outline of the slotted patch antenna. The insulator material properties in this example are low loss, and with a dielectric constant of approximately 3.0. In some embodiments, this layer may have slots or holes strategically placed throughout the slotted patch antenna to permit air flow for the purpose of breathability.

Shielding of electric currents: The shielding conductor segments 101 and 102 form a second conductor to guide the current that flows on conductor layer two while preventing the field from interacting with the medium at the shielded locations, such that energy is not lost to the medium. The placement of the shielding segments results in a capacitance between the two metal layers and forms a transmission line for the current that is oscillating on the slotted patch antenna, minimizing field exposure to the medium at the shielded locations.

The width and length of the shielding segments 101 and 102 may be adjusted to tune the capacitance and inductance between them and the strip in the conductor layer below. These dimensions may be adjusted and may control the overall capacitance and inductance of the slotted patch antenna, thus tuning the frequency of resonance of the slotted patch antenna. This flow of current and charge storage around the edges of the slotted patch antenna allows the electrically small slotted patch antenna to be in resonance at the frequency of operation.

Matching the slotted patch antenna: For there to be a minimized reflection from the ground 101 and signal 102 conductors at the RF feed connection of the coaxial cable, the slotted patch antenna needs to be matched overall. That is, the current of the slotted patch antenna must be able to flow, in resonance, with the timing of the signal delivered at the RF feed connection. The capacitance between the layers receive, distribute, and temporally store the charge as RF current is received from the cable at the feed point 105.

This RF energy is simultaneously coupled through the isolation layer as shown in FIG. 3 below the ground place 103 and the signal 104 conductors to the transmitting layer as shown in FIG. 2. The radiating layer of the slotted patch antenna receives the RF energy from the feed conductors and transmits the RF energy into the medium in front of the radiating layer and through the slots shown in FIG. 2 elements 203 and 204.

In addition to enhancing the conductive matching for the slotted patch antenna, the metal slots play a fundamental role in the overall shape of the slotted patch antenna that controls the distribution of the electric field about the center of the transmitting conductor layer of the slotted patch antenna as shown in FIG. 2. Slotted patch antenna slots can be of various sizes and shapes, depending on the embodiment, provided that the slotted patch antenna match is maintained for sufficient power transfer, and the transmitted field distribution is adequate.

Figure 4:
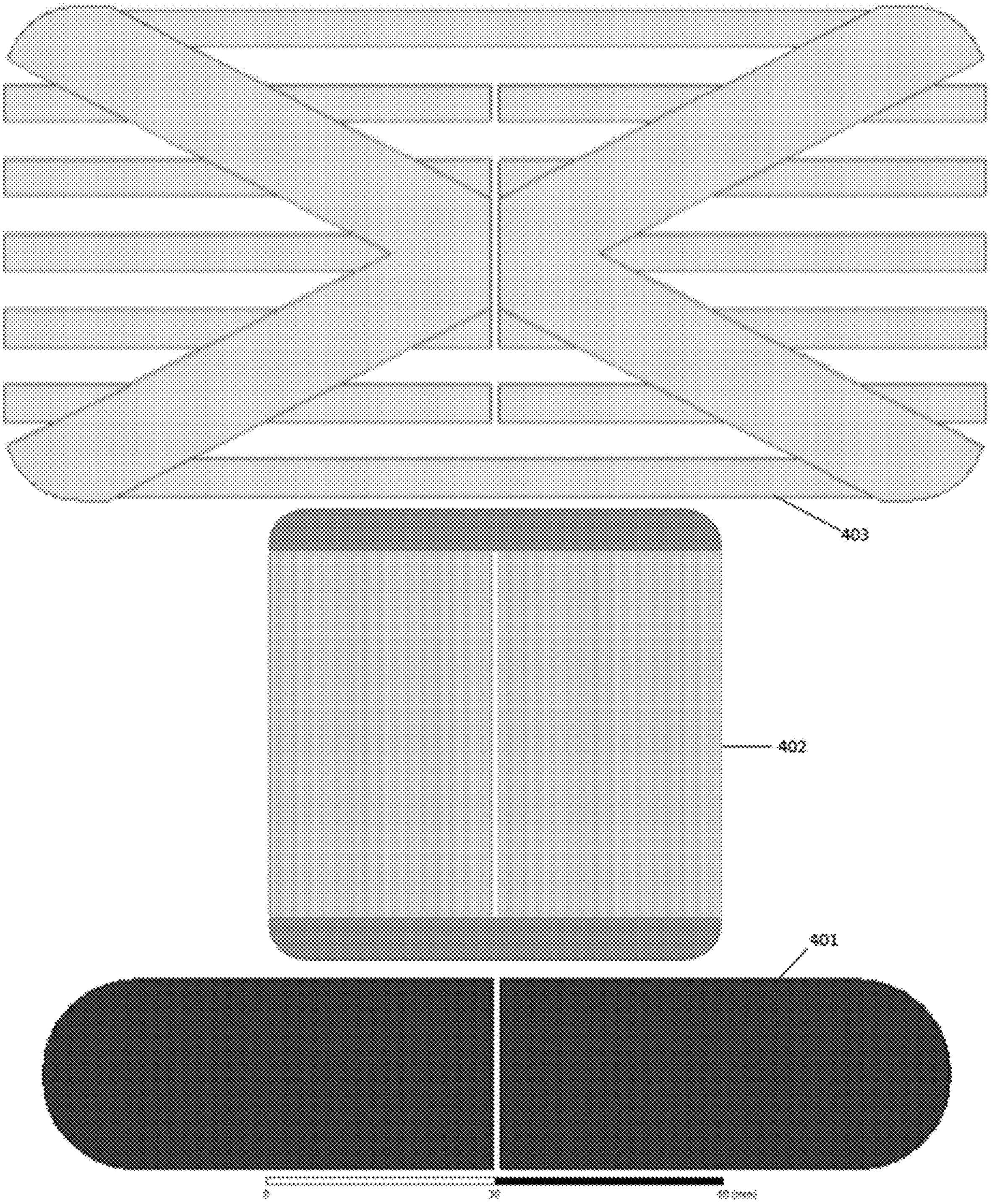
FIG. 4 depicts the outline of the slotted patch antenna 402 (first conductor layer only) compared to two existing antennas 401 (dipole) and 403 (dipole array) for the purpose of transmitting RF signals into tissue. The existing antennas 401 and 403 are designed to transmit at the same RF frequency as the slotted patch antenna 402, although substantially larger.

A visual comparison of the slotted patch antenna performance compared to examples of traditional antennas is shown in FIG. 4. The RF cycle of the slotted patch antenna is detailed herein.

Figure 5:
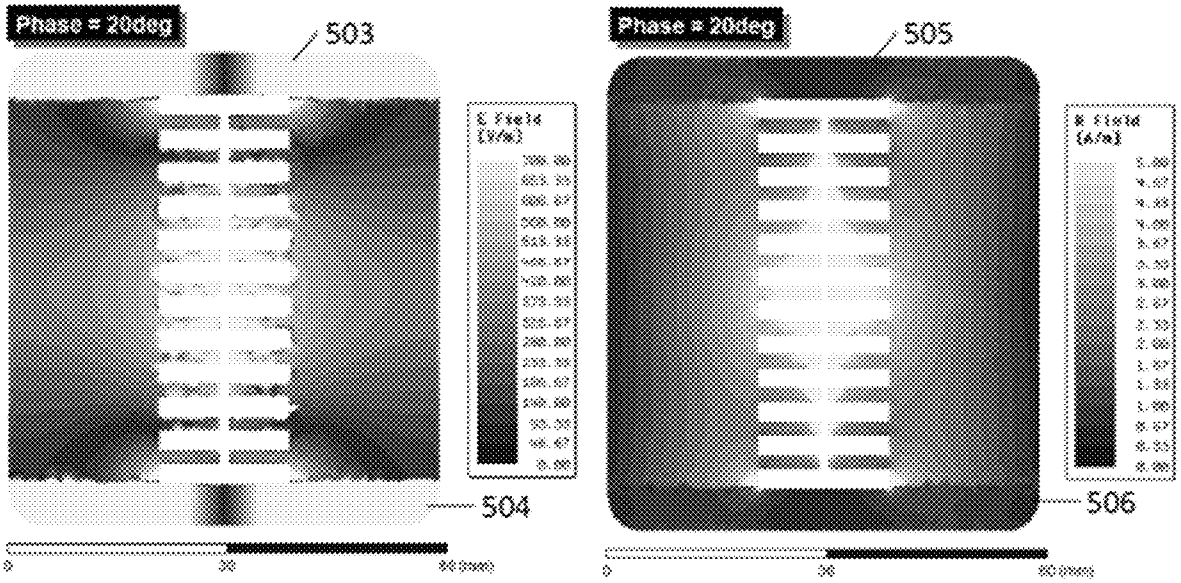
FIG. 5 depicts computer simulation results plotted for the second conductor layer of FIG. 2 when the slotted patch antenna transmits RF signal into a medium. For a source field phase of 20°, the magnitude of electric field is shown at left, and the magnitude of the magnetic field is shown at right.
Figure 6:
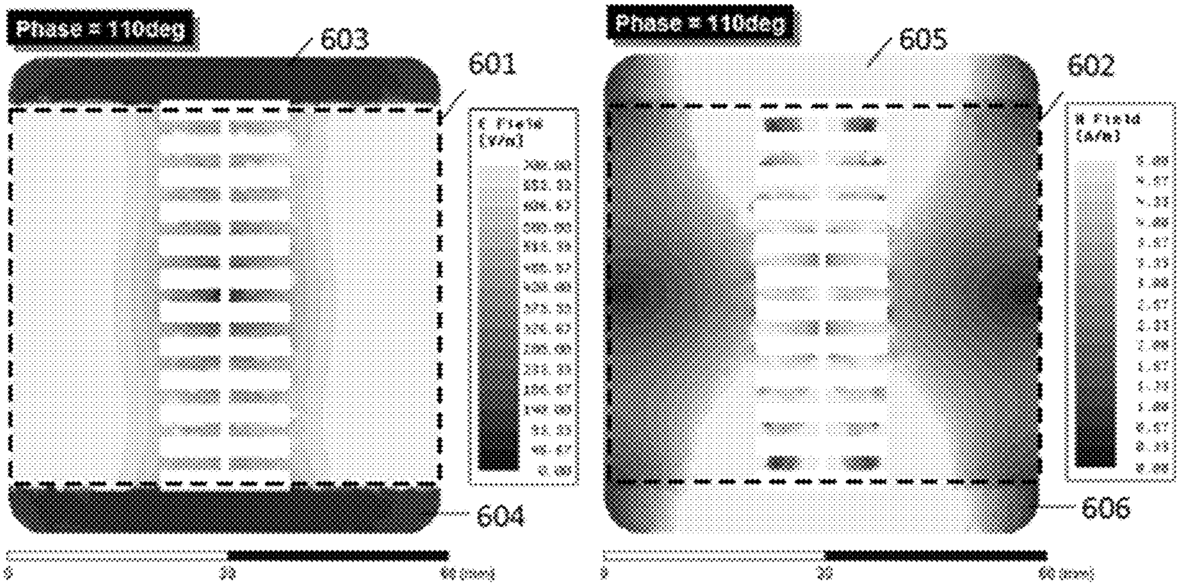
FIG. 6 depicts computer simulation results plotted for the second conductor layer of FIG. 2 when the slotted patch antenna is transmitting RF signal into a medium. For a source field phase of 110°, the magnitude of electric field is shown as the E field 601, and the magnitude of the magnetic field is shown as the H Field 602.

FIG. 5 and FIG. 6 depict typical E-field distributions of the field magnitudes between various conductor layers described above, including the electric (E) field (left) and magnetic (H) field (right) as the fields oscillate between two conductor layers.

Figure 7:
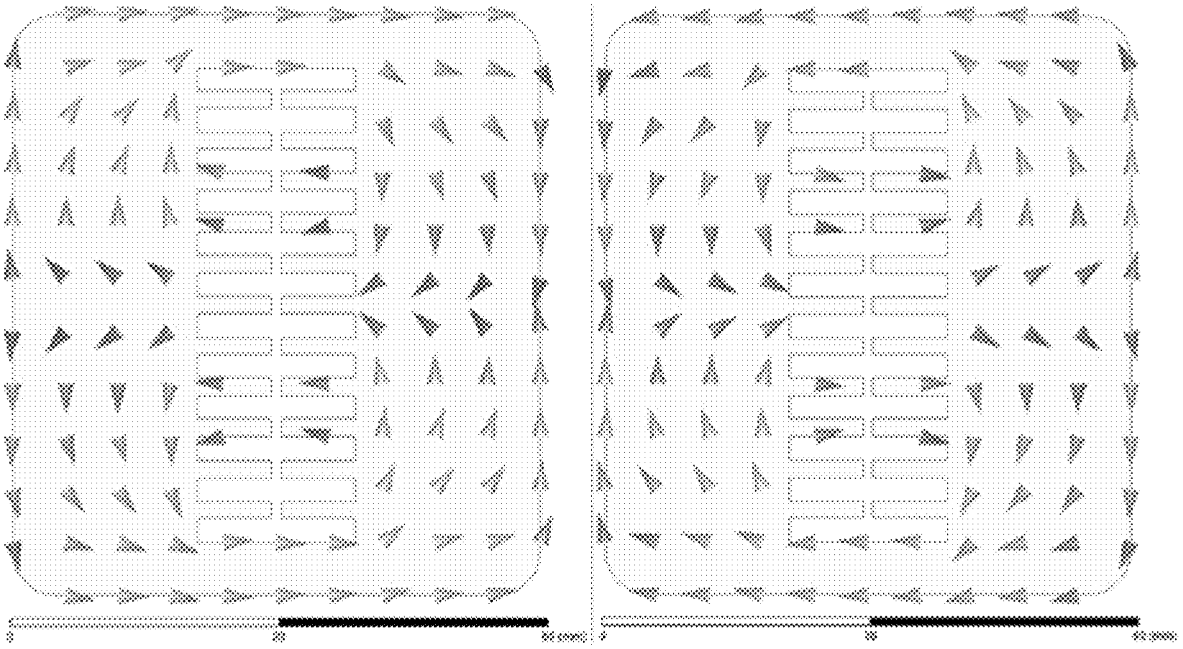
FIG. 7 depicts computer simulation results plotted for the second conductor layer of FIG. 2 when the slotted patch antenna is transmitting RF signal into a medium. Two plots are shown of the instantaneous vector surface current showing the direction of current flow at two different phases of the RF waveform. On the left, currents are observed circulating on the conductor layer in one sense, and on the right, currents are observed circulating in the opposite sense.

FIG. 7 depicts a typical E-field distribution of the vector direction of current flow for the slotted patch antenna, demonstrating the circulation paths of the current for the example embodiment.

In a typical embodiment, RF energy is supplied by a transmitter via an RF transmission line such as a coaxial cable or microstrip line, where the electrical current flows from the source at the center feed point 105 of the slotted patch antenna onto the feed conductors, signal 104 and ground conductor 103 segments. The horizontal slots 107 and 108 in conductor layer one isolate the RF current from the shielding conductors 101 and 102, preventing the current on the feed metals from flowing around to the other end of the slotted patch antenna, such that electric charge builds up and electric field 601 builds up in the feed conductor region between the two conductor layers of FIG. 6.

In a typical embodiment, the RF energy is capacitively coupled to the transmitting metal layer where a voltage potential arises that drives currents, resulting in magnetic field 602 buildup on the transmitting metal layer below the feed conductor segments. At 110° phase snapshot, the electric field in the shielded conductor region 603 and 604 of the slotted patch antenna approaches zero (zero voltage between the shield conductor and the transmitting conductor) and the magnetic field in the shielded region 605 and 606 is at a maximum value (maximum current flow from one end of the slotted patch antenna to the other).

Typically, in these types of embodiments, the direction of current flow is controlled by the slots of two conductor layers. The current follows the path of least resistance around the sides of the slotted patch antenna along the shielded path, while current flows, causing electric field buildup between the shielding conductor 101 and 102 and the segments of conductor on layer one. At 20° phase shift, the electric field shown in 503 and 504 in the shielded region of the antenna is near maximum (maximum voltage between the shield conductor and the transmitting conductor) and the magnetic field 505 and 506 is near zero (zero current flow from one end of the slotted patch antenna to the other).

The current flowing around the slotted patch antenna and back through the center causes a distribution of the electric field at the center slot 203 of the conductor layer two, creating a polarized transmitted electric field into the medium in front of the slotted patch antenna.

In typical embodiments, during the RF cycle, when the driving source reverses the polarization, the currents will flow in the opposite direction, while RF field is generated in the medium by the transmitting-layer slot of the slotted patch antenna.

FIG. 7 depicts the typical current vector directions of the current flow for the typical embodiment of this invention. In this example, flow is generally circular with respect to the slotted patch antenna. The current flows across the center slot, then flows vertically, then flows horizontally across to the opposite end of the slotted patch antenna.

Figure 8:
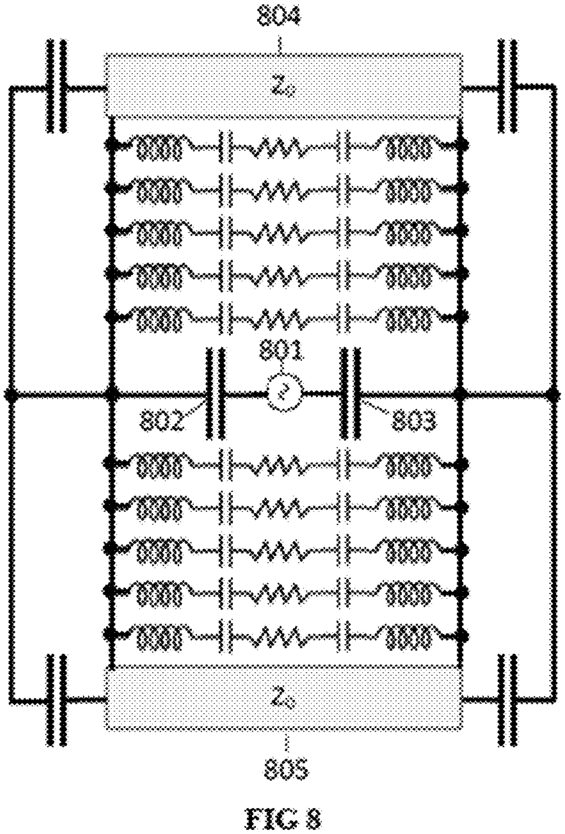
FIG. 8 depicts a simplified circuit model of the slotted patch antenna.

FIG. 8 depicts an approximate circuit model of the slotted patch antenna for a typical embodiment. The RF feed source 105, which is connected at the center of the slotted patch antenna to the ground conductor segment 103 and the signal conductor segment 104, are represented by an RF supply circuit element 801. The capacitance between the feed conductor segments 103 and 104 to the transmitting layer of FIG. 2 is represented typically by circuit capacitance elements 802 and 803, respectively.

The slotted patch antenna current paths under the shielding segments 101 and 102 are typically represented by transmission lines 804 and 805. The capacitance between the shielding conductor segments 101 and 102 is represented by capacitance elements placed at both ends of the transmission lines segments 804 and 805. These transmission line segments 804 and 805 may exhibit a characteristic impedance (Zo) that is controlled by the width of the shielding segments 101 and 102 and the thickness of the dielectric layer shown in FIG. 3.

The slotted patch antenna impedance, controlled by the geometry of the slots 201, 202, 203, and 204, is represented by a distributed inductor-capacitor-resistor (LCR) circuit network. Each circuit branch in the LRC network has a resistor (R) in the center with symmetrically connected capacitor (C) and inductor (L) on each side of the resistor, all connected in series. The resistors represent the lossy medium on which the slotted patch antenna is placed. The total resistance in the distributed circuit is analogous to the radiation resistance in a circuit model for a conventional antenna radiating into free space. The capacitor and inductor at each end of the resistor represent the inductance and capacitance of the conductor traces surrounded by the slots 201, 202, 203, and 204.

In a typical slotted patch antenna, transmission performance is compared to examples of traditional antennas that are used for a similar propose. FIG. 4 depicts the layouts of the various legacy antennas that were simulated, compared to the smaller size of the slotted patch antenna 402. The traditional antennas model are two embodiments of transmitting antennas, a classic dipole 401 and a classic dipole array 403. The traditional antennas were simulated transmitting to a model of a receiving device embedded in a typical tissue medium.

Slotted patch antennas send their energy through a tissue medium to a receiving device (Rx) antenna which can be adequately simulated through a RF energy transmission model. FIG. 9 depicts a typical layout of a type of Rx antenna used in simulation to estimate performance of the antenna coupling between the various forms of transmitting antennas, the traditional dipole or dipole array, and the enhanced performing slotted patch antenna. The Rx antenna is a thin conductor trace, typically in some embodiments 1 millimeters wide, up to 100 millimeters long, surrounded by an air insulation layer, 10 millimeters thick, on top and bottom of the trace, and at both edges of the conductor trace. In a typical embodiment, there is a 1 millimeters long slot isolating the two antenna arm conductors 901 and 902, thus forming a dipole. A port 903, set to 500Ω load, is typically connected to the Rx antenna feed at the center of the Rx antenna, mimicking the receiving device input impedance surrounding the Rx antenna.

Antenna models for full-wave simulation in free space can be modified to exemplify the scenarios of a transmitting antenna radiating to an implanted receiving antenna in tissue mediums. In this example embodiment, the simulation frequency utilized was 915 MHz. In various embodiments, frequencies in the GHz ranges could be utilized from 100 MHz to 100 GHz. FIG. 10 lists the typical media simulated in a simple-layer model that is an approximation for a cross-section of the tissue medium types found in a human ankle. The materials are listed in order from nearest to the front of the antenna to the farthest from the antenna. The dielectric constant and electric conductivity are for 915 MHz in this example.

FIG. 11 shows the cross-section of the simulation space with air above 1112 and air below 1113 the simple-layer model. The slotted patch antenna model 1110 is transmitting into the simple-layer model, through a layer of cotton 1101 that may represent clothing, then through a skin layer 1102, followed by a layer of fat 1103. In this example, the Rx model 1111 was located between a layer of fat 1103 and the first layer of bone 1104.

In a typical embodiment for purposes of this example, a transmission power level is assumed that creates a typical transmission coverage area. The resulting transmission coverage area is defined as the zone wherein the transmitting antenna can be located over the receiving antenna implanted device, in a plane parallel to the receiving antenna implanted device, for which the receiving antenna implanted device receives sufficient power for normal operation.

Figure 12:
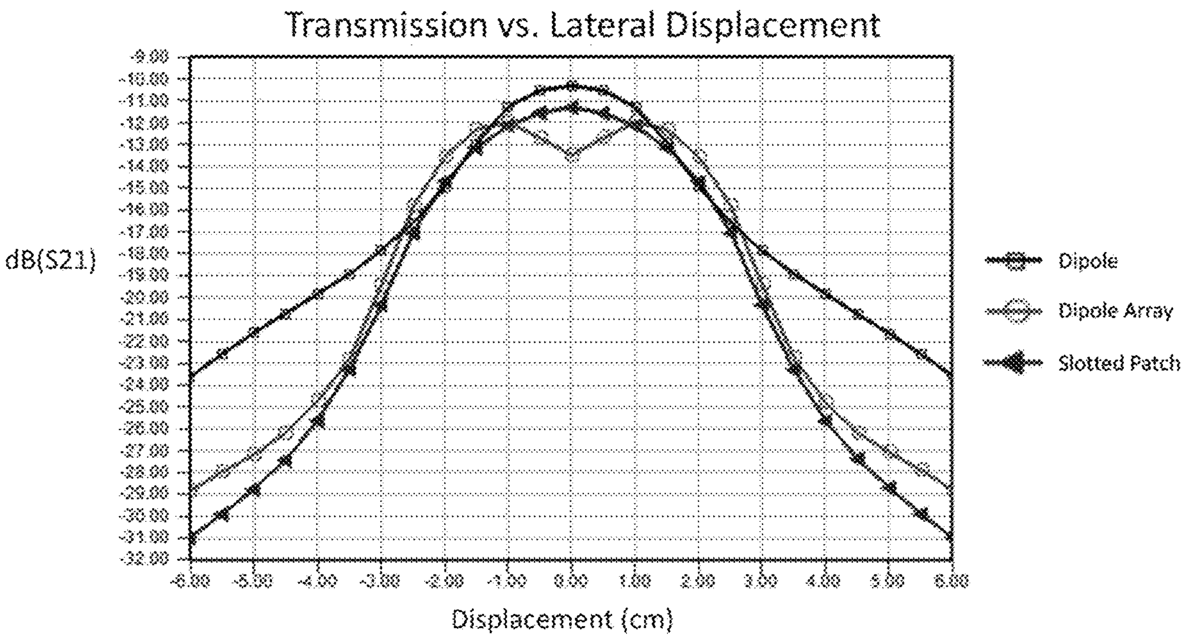
FIG. 12 and FIG. 13 show the simulated RF transmission performance of the slotted patch antenna when transmitting to a receiving device embedded in a simple-layer model.
Figure 13:
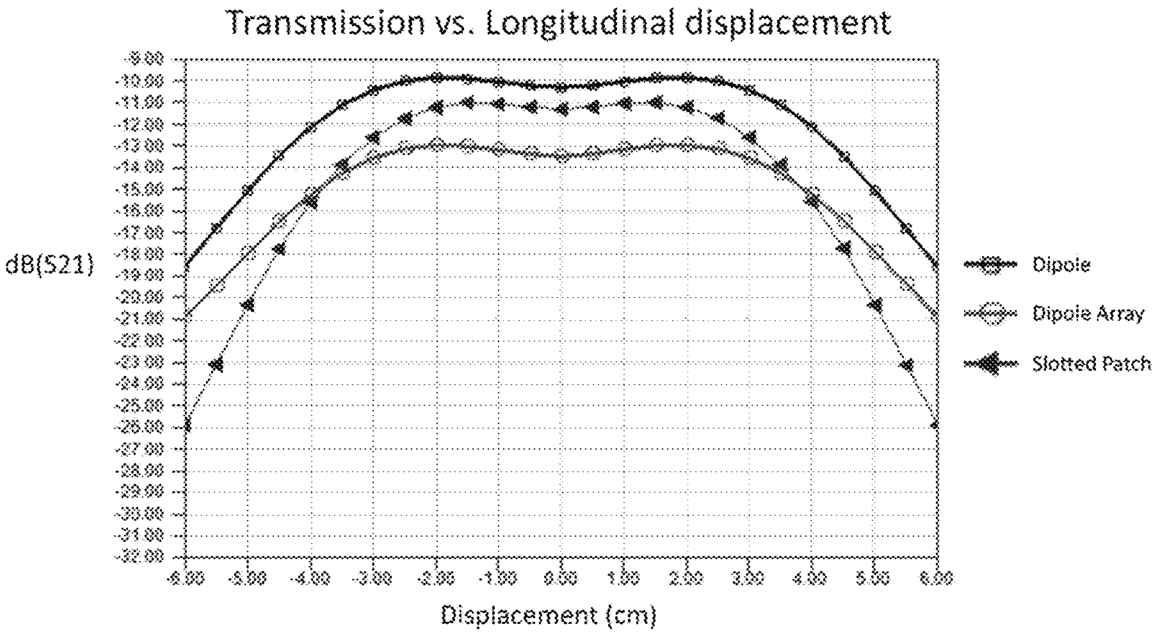

For this simulation, the receiving antenna implanted device was held at a single depth and single angular alignment, as shown in FIG. 11, while the receiving antenna implanted device position was swept first laterally, then longitudinally, relative to the position of the transmitting antenna. The transmission coverage area was plotted vs. position for the three comparable transmitting antennas shown in FIG. 4: dipole antenna 401, dipole array antenna 403, and slotted patch antenna 402. The simulation results for transmission vs. lateral displacement are plotted in FIG. 12, and the simulation results for transmission vs. longitudinal displacement are plotted in FIG. 13.

The receiving antenna implanted device 1111 is a simple model used for the purpose of comparing transmission performance of body-worn antennas. However, in practice, the receiving antenna implanted device may have one or more RF receiver elements, and it may have circuitry for RF signal rectification. The system may also include an external controller, for example a user-interface device that allows parameters of the RF transmitter to be adjusted.

In one example, the receiving antenna implanted device is an implantable stimulator device that is powered wirelessly by RF power transmitted by the slotted patch antenna into the body. The polarized RF field created in the body by the slotted patch antenna allows the Rx device to receive power via one or more colinear receiving elements, meaning the Rx design can be physically very narrow. For example, the device can be made sufficiently narrow to pass through a needle during the implantation procedure. In contrast, receiving devices that receive power by use of inductive coils must be inherently larger in size.

The slotted patch antenna may be coupled directly to a medium to create an electric field that interacts with a receiving antenna implanted device. The coupling mechanism between the slotted patch antenna and the receiving device is not inductive coupling, rather it is specifically either electrical radiative coupling or electrical near-field coupling. The coupling occurs via electric fields rather than magnetic fields.

The slotted patch antenna design may be modified to achieve a more selective spatial transmission profile so that transmitted power may be distributed as desired at the location of the receiving device in the medium. Further, the elements of the slotted patch antenna may also be sized and shaped to form a desired RF field pattern in a medium that is advantageous to a given reception characteristic of a receiving device. In one example described here, the Rx is an implantable stimulator having a dipole receiver, and the slotted patch antenna is configured to create RF fields in the body that are suitable for the characteristics of the dipole receiver.

A feed layer of the slotted patch antenna may be provided above the transmitting layer(s), the feed layer having two halves, each being connected to a phase of an RF source. The feed layer may include conductor segments, and it may have a gap that divides the feed layer. The feed layer may be rectangularly shaped or may have other shapes. The feed points (one or more per segment pair) may be located at a central portion of the feed layer. In one example, each feed point may be connected to one conductor of a coaxial cable.

The material forming the conductors of the slotted patch antenna may be metal, or one or more of these elements may be of other conductive media such as conductive ink. The dielectric layer may be composed of one or more media. Media include any of several conventional substrates used for printed circuit boards as well as non-conventional media such as fabric, rubber, or foam.

In one embodiment, the slotted patch antenna is constructed by application of conductive ink onto elastic polyurethane material such as Lycra. Generally speaking, this is a unique and non-conventional construction method for an RF antenna. The design of the slotted patch antenna makes possible a body-worn slotted patch antenna that is flexible, breathable, and conformable to the body. The fabric-based slotted patch antenna may be embedded in clothing, for example.

Given the benefit of this disclosure, a person of ordinary skill in the art will recognize that the exact arrangements and sizes of the conductor segments and slots, or the number of layers, as shown in the figures, are not necessarily required. Other embodiments of the slotted patch antenna are within the scope of the following claims.

What is claimed is:

1. A slotted patch antenna assembly, comprising:

a wearable slotted patch antenna that comprises:

a conductive signal layer comprising a radiating surface;

a feed conductive layer comprising a feed point; and an insulating layer in between the conductive signal layer and the feed conductive layer that is slotted between the conductive signal layer and the feed conductive layer, wherein the conductive signal layer, the feed conductive layer, and the insulating layer are fabric-based and slotted, wherein the slotted patch antenna is shaped and sized to be embedded in clothing of a subject with sufficient flexibility to be stretched and bent, and wherein the slotted patch antenna is electrically tuned and configured to have the radiating surface of the conductive signal layer facing skin of the subject and the feed point of the feed conductive layer connecting to a controller such that the slotted patch antenna is non-inductively coupled to a passive implantable receiving antenna device.

2. The slotted patch antenna assembly of claim 1, wherein the conductive signal layer comprises:

two or more conductor strips.

3. The slotted patch antenna assembly of claim 2, wherein the two or more conductor strips comprise conductive ink printed on fabric material.

4. The slotted patch antenna assembly of claim 2, wherein the two or more conductor strips comprise an upper conductor strip and a lower conductor strip symmetrically shaped to form the conductive signal layer detached by slots.

5. The slotted patch antenna assembly of claim 2, wherein at least a slot between the two or more conductor strips.

6. The slotted patch antenna assembly of claim 5, wherein the feed point is located at a central gap and configured to connect to the controller device via a coax cable.

7. The slotted patch antenna assembly of claim 2, wherein the wearable antenna is characterized by a transmission loss profile that varies no more than 2 dB over a region where the passive implantable receiving antenna device is located in tissue medium.

8. The slotted patch antenna assembly of claim 2, wherein the slotted patch antenna is characterized by a reflection profile in which reflected power remains at least 8 dB lower than an input power over a region where the passive implantable receiving antenna device is located in tissue medium.

9. The slotted patch antenna assembly of claim 2, wherein the slotted patch antenna has a power deposition pattern that varies by less than 33% over an implantation depth of 1 cm of the passive implantable receiving antenna device.

10. The slotted patch antenna assembly of claim 2, wherein the slotted patch antenna is tuned and matched throughout a band of operating frequencies that range from a first frequency of about 300 MHz to a second frequency of about 3 GHz.

11. The slotted patch antenna assembly of claim 1, wherein the slotted patch antenna comprises a single slotted patch antenna.

12. The slotted patch antenna assembly of claim 11, wherein the slotted patch antenna is characterized by a transmission loss profile that varies no more than 1 dB over a region where the passive implantable receiving antenna device is located in tissue.

13. The slotted patch antenna assembly of claim 11, wherein the slotted patch antenna is characterized by a reflection profile in which reflected power remains at least 20 dB lower than an input power over a region where the passive implantable receiving antenna device is located in tissue medium.

* * * * *